United States Patent [19]

Fortune

[11] Patent Number: 4,838,400

[45] Date of Patent: Jun. 13, 1989

[54] TORQUE LIMITING CLUTCH

[75] Inventor: David J. Fortune, Weston, United Kingdom

[73] Assignee: GIB Precision Limited, Cirencester, United Kingdom

[21] Appl. No.: 87,669

[22] Filed: Aug. 20, 1987

[30] Foreign Application Priority Data

Aug. 20, 1986 [GB] United Kingdom ............... 20214

[51] Int. Cl.[4] .......................................... F16D 43/20
[52] U.S. Cl. .................................... 192/56 R; 464/36
[58] Field of Search ...................... 192/56 R; 464/36

[56] References Cited

U.S. PATENT DOCUMENTS

| 3,722,644 | 3/1973 | Steinhagen | 192/56 R |
| 3,774,738 | 11/1973 | Steinhagen | 192/56 R |
| 4,007,818 | 2/1977 | Orwin | 192/56 R |
| 4,541,512 | 9/1985 | Beasant et al. | 192/56 R |

FOREIGN PATENT DOCUMENTS 2080449B 5/1984 United Kingdom.

Primary Examiner—Rodney H. Bonck
Attorney, Agent, or Firm—Arnold, White & Durkee

[57] ABSTRACT

A torque limiting clutch comprises a driving part and a driven part disengagably interconnected in torque transmitting relationship by a torque transmitting element guided by a cage, a spacer movable by the cage into spacing relationship with both the driving and driven parts on disengagement of the clutch by relative movement between the parts in either direction, to maintain the torque transmitting element out of torque transmitting relationship with the parts. The clutch is re-engagable by relative rotation between the driving and driven parts in the opposite direction. The clutch includes two sets of inter-engagable abutments, the abutments of the first set being provided on the cage and the abutments of the second set being provided on one of the parts and being operable to cause abutments of the first and second to inter-engage to cause the cage and one of the parts to rotate together. The clutch further includes a first plurality of abutments of each set operable on relative rotation between the clutch parts in the opposite direction to that in which a second plurality of abutments of each set is operable. The abutments are biased in a direction towards inter-engagement, and inter-engagement of the abutments is controlled to permit disengagement of the clutch and re-engagement on relative rotation between the parts in the reverse direction to the direction of disengagement.

10 Claims, 6 Drawing Sheets

TORQUE LIMITING CLUTCH

BACKGROUND OF THE INVENTION

This invention relates to a torque limiting clutch comprising a driving part and a driven part disengageably inter-connected in torque transmitting relationship by a torque transmitting element guided by a cage, a spacer movable by the cage into spacing relationship with said parts, on disengagement of the clutch by relative rotation between said parts in either direction, to maintain the torque transmitting element out of torque transmitting relationship with said parts and the clutch being re-engageable by relative rotation between said parts in the opposite direction, the clutch including inter-engageable abutments, on the cage and on one of said parts to inter-engage to cause said cage and one of said parts to rotate together during re-engagement on relative rotation between said parts in the reverse direction to the direction of disengagement.

Such a clutch will be referred to hereinafter as "of the kind specified", and an example is shown in GB-B-2080449 where these are two pairs of said inter-engageable abutments.

A problem has been encountered with such a clutch of the kind specified where the clutch is incorporated in a drive which has low inertia. In these circumstances when an operator reverses the drive to re-engage the clutch the speed of rotation of the part of the clutch connected to the motor is accelerated to such a speed that the abutments do not have sufficient time to re-engage. When the operator notices this lack of drive he switches off the motor and as the speed falls the abutments have sufficient time to start to move into interengagement but because this occurs as the speed is falling several attempts to engage sufficiently to lock in position may occur. The first few attempts will result in wear of the abutments which will eventually prevent re-engagement completely.

An object of the invention is to over come this problem.

The clutches described in the above referred to specification have the torque transmitting elements maintained in their receiving means by virtue of providing a taper to the bore in the cage in which they are received and biasing the cage by spring means towards the clutch part having the receiving means.

It has been found, however, that the use of springs to bias the cage plate in this way is not effective in all situations particularly where the receiving means comprise recesses separate to the torque transmitting recesses and of greater diameter and depth than the torque transmitting recesses.

Accordingly a further object of the invention is to over come this problem.

SUMMARY OF THE INVENTION

According to one aspect of the present invention we provide a torque limiting clutch comprising a driving part and a driven part disengagably inter-connected in torque transmitting relationship by a torque transmitting element guided by a cage, a spacer movable by the cage into spacing relationship with said parts on disengagement of the clutch by relative movement between said parts in either direction, to maintain the torque transmitting element out of torque transmitting relationship with said parts and the clutch being re-engagable by relative rotation between said parts in the opposite direction, the clutch including two sets of inter-engagable abutments, the abutments of a first of said sets being provided on the cage and the abutments of the second of said sets being provided on one of said parts and being operable to cause abutments of the first and second sets to inter-engage to cause said cage and one of said parts to rotate together, a first plurality of abutments of each set being operable on relative rotation between the clutch parts in the opposite direction to that in which a second plurality of abutments of each set is operable, biasing means normally to bias the abutments in a direction towards said inter-engagement, and control means to control inter-engagement of said abutments to permit of disengagement of the clutch and re-engagement on relative rotation between said parts in the reverse direction to the direction of disengagement.

A recess may be provided in one of said parts to accommodate the torque transmitting element when the clutch is disengaged and the abutments of the second of said sets being provided on the other of said parts and the abutments being operable to cause abutments of the first and second sets of inter-engage to cause said cage and other of said parts to rotate together.

The control means may comprise first control means provided on said one clutch part;

(a) to prevent interengagement of said abutments of one pair when said clutch is disengaged as a result of relative rotation in one direction whilst permitting interengagement of said abutments of the other pair on resetting by relative rotation in the reverse direction to said one direction; and (b) to prevent interengagement of said abutments of the other pair when said clutch is disengaged as a result of relative rotation in the opposite direction to said one direction whilst permitting interengagement of the abutments of said one pair on resetting by relative rotation in the reverse direction to said other direction.

and second control means to maintain said abutments of both pairs out of interengagement during the initial stages of disengagement of said clutch.

Retaining means may be provided between the one part and the cage to limit movement of the cage away from the one part and the cage having openings to receive said torque transmitting element and being shaped to restrain movement of the torque transmitting element away from said one part.

The retaining means may comprise male and female interengaging portions provided around the periphery of the cage and an adjacent part of the one clutch part.

The female part may comprise a rebate having a frusto-conical surface and the male part a frusto-conical surface of co-operating configuration with the female frusto-conical surface.

The female part may be provided on the one clutch part and the male part on the cage.

There may be more abutments in the second set than in the first set.

There may be twelve torque transmitting elements and six abutments in each of the first and second pluralities of the second set and two abutments in each of the first and second pluralities of the first sets.

Alternatively, there may be fourteen torque transmitting elements and eight abutments in each of the first and second pluralities of the second set and four abutments in each of the first and second pluralities of the first set.

The abutments of the second set may comprise spring biased pawls and the abutments of the first set being surfaces adapted to be engaged by the pawls.

A separate pawl may be provide one abutment of the first plurality and one abutment of the second plurality of abutments of the second set and each pawl may be mounted on said other clutch part for movement generally parallel to the axis of rotation of the clutch and have an end part, substantially diametrically opposite surface parts of which provide said abutments which are adapted to engage an abutment surface of the first set provided on the cage.

The first and second control means may comprise a cam surface provided on the one clutch part and facing said other clutch part and having a first surface part adjacent the other part which engages said pawls so that said pawls are maintained out of engagement with the abutments of the cage during said initial stages of disengagement, and having a second surface part spaced further away from the other part to permit the pawls to move into position for engagement with the abutment surfaces of the cage and third, inclined, surface parts between the first and second parts wherein on continued relative rotation between the one and other clutch parts after disengagement, said third surface parts displace the pawls out of position for engagement with the abutment surfaces of the cage whilst the pawls are permitted to move into engagement with an abutment surface of the cage on reverse rotation.

Interengageable abutments may be provided to restrain rotation of the cage relative to said one part on disengagement.

The spacer may be in anti-friction engagement with at least one of the driving and driven parts.

The spacer may be rotatable and circular in cross-section taken radial to its axis of rotation.

The spacer may be positioned between a first track associated with one of the clutch parts and a second track associated with the other of the clutch parts, there being recesses in at least one of the tracks of such dimensions as to maintain the spacer out of pressure contact with the tracks during torque transmittal.

Preferably a plurality of torque transmitting elements and spacers are provided.

The recess for the torque transmitting element may be deeper and wider than a recess which provides the torque transmitting abutment.

Two embodiments of the invention will now be described in more detail by way of example with reference to the accompanying drawings, wherein:

DESCRIPTION OF THE PREFERRED EMBODIMENTS

Figure 1:
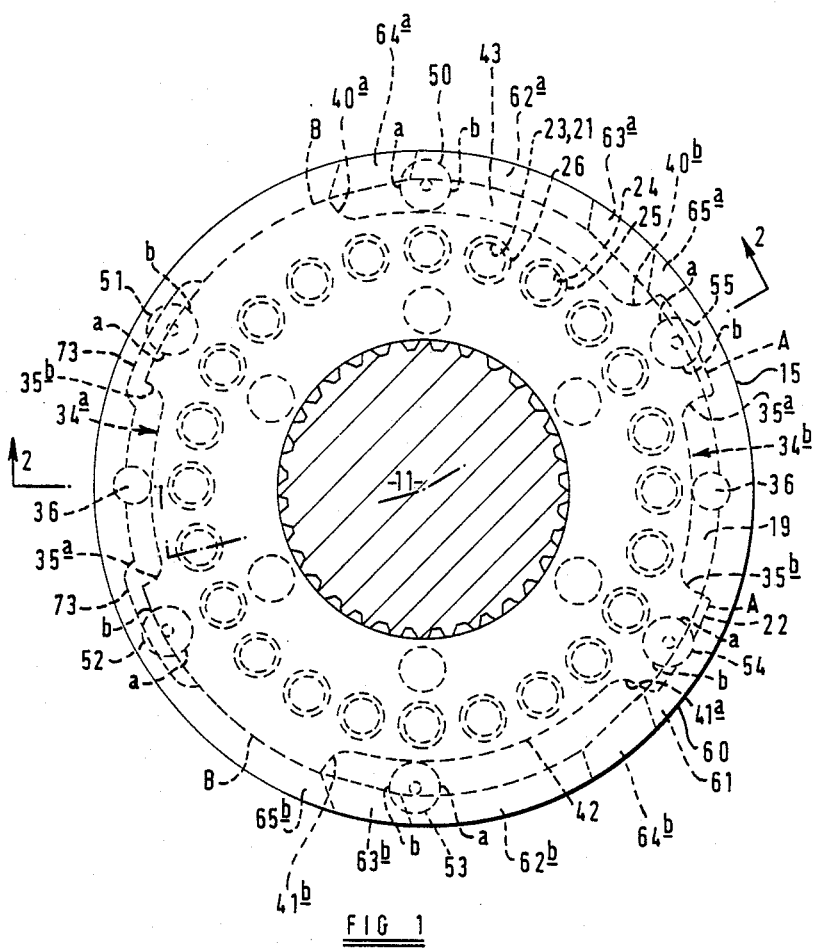
FIG. 1 is a section on the line 1—1 of FIG. 2 of a torque limiting clutch embodying the invention, showing the parts whilst the clutch is engaged.

Referring to the drawings, there is illustrated a torque limiting clutch comprising drive transmitting members 10 and 11. In this example the member 10 will be described as a driving member for connection to a prime mover and 11 as a driven member for connection to an application to an apparatus to drive, but it should be understood that if desired, in use the member 11 may be the driving member and the member 10 would then be the driven member.

The driving member 10 provides a body 12 of the torque limiting clutch.

The drive member 11 is rotatably mounted within the body 12 by means of a suitable rolling thrust and journal bearing 13 interposed between a flange 14 on the member 11 and the driving member 10.

The driven member 11 has one clutch part 15 splined thereto for axial sliding and non-rotating movement relative to the driven member 11. A nut 16 is threadedly engaged with the outer end 17 of the driven member 11 and a coil compression spring 18 is interposed between the nut 16 and the one clutch part 15 to urge the one clutch part 15 towards the clutch body 12, an end part of which comprises another clutch part 19.

Interposed between the one and other clutch parts 15,19 respectively are a plurality (in the present example 12) of torque transmitting elements in the form of spherical hardened steel balls 20. The balls 20 are received in bores 21 formed in a cage 22. The bores 21 are tapered towards their one end which is adjacent to the clutch part 19 to prevent the balls 20 escaping therefrom at that end and thus to restrain the balls from axial movement, in the disengaged condition of the clutch, towards the clutch part 19 as hereinafter to be described.

Each clutch part 15, 19 is also formed with a corresponding number (in the present example 12) of torque transmitting abutments 23, 24 respectively, each taking the form of a generally frusto-conical recess.

The torque transmitting abutments 23, 24 and bores 21 are arranged so as to be mutally registerable so that the balls 20 can be received in the bores 21 and engage both the driving and driven abutments 29, 30 to permit the transmission of torque as hereinafter to be described in more detail.

The clutch part 15 is also formed with a plurality, (in the present example 12) of torque transmitting element receiving means 25 which are slightly deeper and wider than the torque transmitting abutments 23; this is preferred and ensures that the balls 20 are maintained out of rolling contact with the clutch part 19 should any spring-back occur when rotation of the cage 22 is arrested by the pegs 36 as hereinafter to be described.

In a modification each receiving means is provided as a result of each torque transmitting abutment 23 having a dual purpose, namely either a torque transmitting abutment during normal torque transmittal or a receiving means when the clutch has disengaged.

The dimensions of the receiving means, whether provided by the separate recess 25 or by the torque transmitting abutments 23 is such that when the clutch is disengaged, with the clutch parts 15, 19 held apart by spacers as hereinafter to be described, the balls 20 have a slight clearance between the receiving means and the surface of the other clutch part 19 in the region intermediate the driving recesses 24 therein whereby no pressure is imposed upon the balls 20 by the surface of the other clutch part 19 whilst the balls 20 are in the receiving means of the one clutch part 15.

The cage 22 is also formed with six spacer receiving bores 26 within each of which is received spacer ball 27.

The one clutch part 15 is provided with six spacer receiving means 28 each of frusto-conical configuration. A first track 29 for the spacers 27, axially fixed relative to the other clutch part 19, is provided by means of an annular member 30. The track member 30 is mounted for rotation relative to the driven member 11 on a thrust race 31 disposed between the track member 30 and the race 13. In the example shown a part circular in cross section groove 32 is provided in the surface of the member 30. A similar groove 33 is provided in the clutch member 15 to provide a second track, for the spacers 27, axially fixed relative to the one clutch part 15. Grooves 32, 33 are not essential where a greater number of balls 27, or larger balls than those shown, are provided. The track member 30 can rotate relative to the clutch parts 15, 19. Thus orbital movement of the spacer balls 27 with the cage 22 is permitted relative to the one clutch part 15 during re-engagement.

Figure 4:
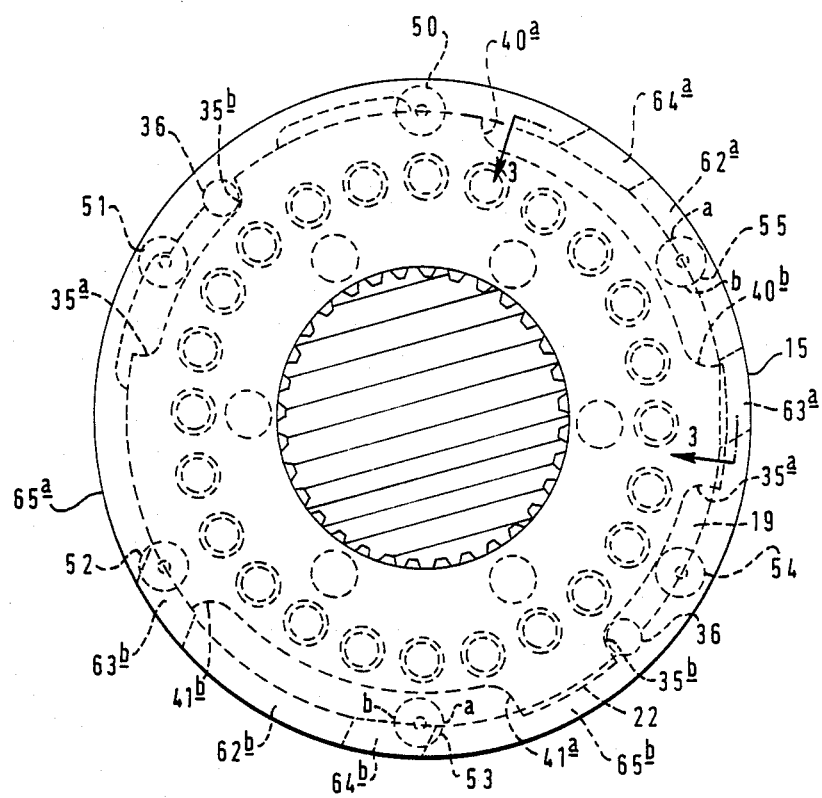
FIG. 4 is a view similar to that of FIG. 1 but showing the clutch immediately prior to starting re-engagement.

Restraining means are provided to limit rotation of the cage 22 relative to the one clutch part 15 hence relative to the driven member 11 by means of a pair of diametrically opposed part circumferential restraining recesses 34a, 34b formed in the periphery of the cage 22. The ends 35a, 35b co-operate with pegs 36 depending downwardly from the one clutch part 15 parallel to the axis of rotation of the clutch. As shown in FIG. 1, when the clutch is engaged, the pegs 36 are in the middle of their associated recess 34a, 34b whilst, when the clutch is fully disengaged, the pegs 36 engage an end part 35a, 35b of the recess 34, depending upon the direction of disengagement of the clutch, to limit further relative rotation between the cage 32 and the one clutch part 15. Engagement with the ends 35b is shown in FIG. 4.

The clutch is provided with two sets of interengagable resetting abutments. The abutments of the first set comprise abutments surfaces 40a, 40b; 41a, 41b provided at the ends of two part circumferential re-engagement recesses 42, 43 of the cage 22.

The abutments of the second of the sets comprise six pawls 50–55 which can project from the body 12. Each pawl is received in a generally cylindrical bore 56 in the body 12. At its upper end each pawl is formed with a head 57 received in a counter bored part 58 of the bore 56. A coil compression spring 59 is provided in a counter bored passage 59a of each pawl and and acts against a base closure, not shown, of each bore 56 normally to bias the associated pawl 50–55 outwardly towards the one clutch part 15.

Each pawl 50–55 provides two abutments by virtue of substantially diametrically opposite surface portions marked a and b in the figures. A first plurality of abutments of each set, namely a first plurality 40a, 41a of the first set and a first plurality 50a–55a of the second set are operable on relative rotation between the cage 22 and the other clutch part 19 in one direction and a second plurality of each set, namely a second plurality 40b and 41b of the first set and a second plurality 50b–55b of the second set are operable on relative rotation between the cage 22 and the other clutch part 19 in the opposite direction.

Figure 3:
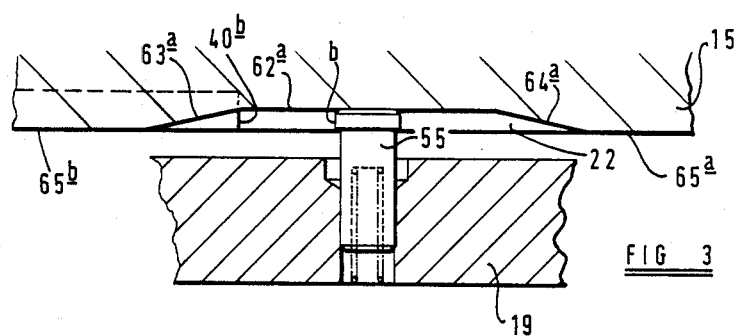
FIG. 3 is a fragmentary cross section of part of the clutch taken along line 3—3 in FIG. 4.

The one clutch part 15 is provided with a peripheral flange portion 60, a lower surface 61 of which provides a cam surface for engagement by the pawls 50–55 and which, as best shown in FIG. 3, has two raised parts 62a, 62b connected by inclined parts 63a, 63b; 64a, 64b to two lower parts 65a, 65b.

In order to maintain the cage 22 adjacent the one clutch part 15 so as to maintain the torque transmitting balls 20 out of the torque transmitting recesses 24 of the other clutch member 19 when the clutch is disengaged a rebate 70 is formed in the one clutch part 15 and the cage 22 is received therein. The rebate 70 has a circumferential wall 71 which is frusto-conical and provides a female formation which co-operates with a male formation on the cage comprising a corresponding frusto-conical surface 72 of the cage. As a result, the cage 22 is restrained from movement away from the one clutch part 15. During assembly of the clutch the larger diameter parts A of the cage 22 between the one recess 34b and the recesses 42, 43 are circumferentially alined with cut outs 73 provided in the circumferential wall 71 of the rebate 70. This permits of the opposite parts B of the cage 22 to be engaged under the circumferential wall 71 and then the cage 22 is rotated through 180° and the hereinbefore described pins 36 are then driven in to the clutch member 15 to retain the clutch plate 22 in position. It will be noted that in this position the larger diameter parts B, of the cage 22 between the other recess 34a and the recesses 42, 43 are of sufficiently great circumferential extent to bridge the cut outs 73 so that the cage 22 is retained adjacent to the clutch part 15.

In use, during torque transmittal the balls 20 are engaged in the torque transmitting abutments 23, 24 and are prevented from moving out of engagement therewith as a result of the force applied to the one clutch part 15 by the coil compression spring 18. The torque transmittal from the driving member 10 to the driven member 11 through the balls 20 produces an axially directed reaction force between the balls and the one and other clutch parts proportional to the transmitted torque which, when the torque exceeds a predetermined value, is sufficient to overcome the pressure exerted by the spring 18. Thus, at this torque the one clutch part 15 commences to move axially away from the other clutch part 19 and simultaneously the balls 20 commence to roll in the direction of rotation of the one clutch part 20 on that part of each abutment recess 23, 24 which is respectively rearmost and foremost in the direction of rotation.

Therefore, the balls 20 now commence to move out of torque transmitting engagement with the recesses 23 and 24 by a simple rolling movement permitted by the engagement between the balls and the edges of the recesses 23 and 24. As the balls rotate they also move circumferentially or orbitally relative to the one and other clutch parts 15, 19 thereby causing the cage 22 to also rotate relative thereto.

Figure 2:
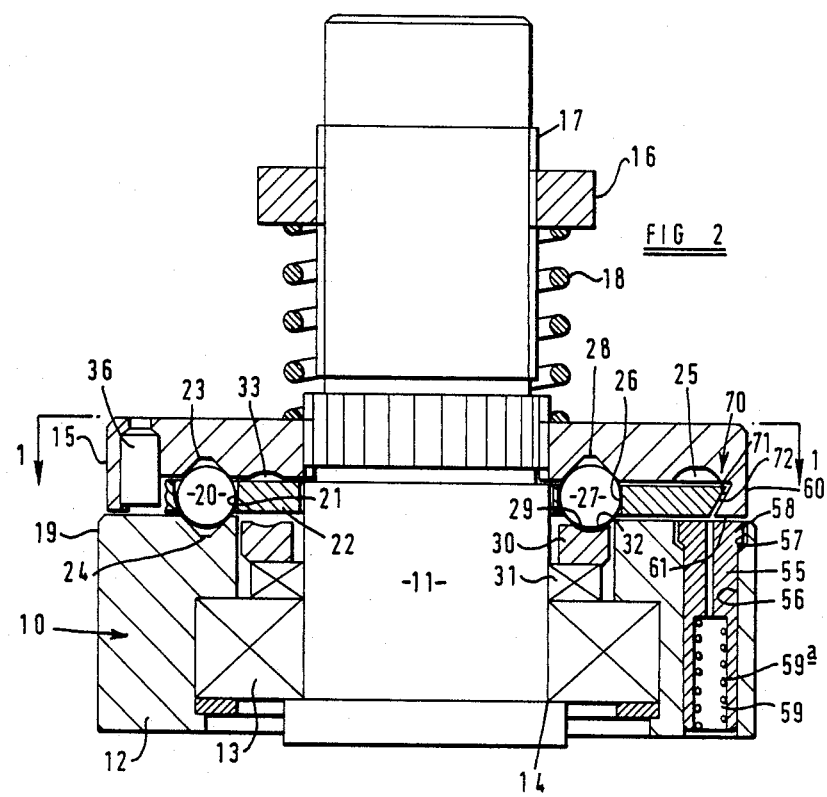
FIG. 2 is a diagrammatic cross-section view on the line 2—2 of FIG. 1.

This causes the spacers 27 to move out of their recesses 28 into the space between the tracks 29, 33. As shown in FIG. 2 the surface of the track 29 is very slightly below the level of the planar part of the other clutch part 19 and hence, at this stage, the spacers 27 are maintained out of pressure engagement with both the tracks 29 and 33.

Rotation of the cage 22 continues until the torque transmitting balls 20 enter their respective receiving means 25 which is the next receiving means 25 in the one clutch part 15 circumferentially adjacent to the torque transmitting recesses 23 they have left. The pegs 36 depending from the one clutch part 15 then engage the end surfaces 35a, 35b of the recesses 34a, 34b and hence positively arrest movement of the cage 22 at this position. As the balls 20 enter the receiving means 25 they move out of pressure engagement with the clutch parts 15, 19 and hence the whole of the load imposed by the spring 18 on the one clutch part 15 is taken by the spacers 27 which are then engaged between the tracks 29, 33. Relative rotation within the clutch parts 15, 20 is permitted by virtue of the rotation of the track member 30 with the one clutch part 15, relative to the clutch part 19 by virtue of the bearing 31.

When the balls 20 have entered the receiving means 25 and hence no longer drive the cage 22 any continuing tendency for rotation of the cage 22 due to inertia is arrested by the hereinbefore mentioned pegs 36 engaged with the recess ends 35a or 35b and hence the balls 20 are maintained within their receiving means.

Becaue the torque transmitting balls 20 are maintained completely unloaded after disengagement of the torque transmitting connection, i.e. when they are engaged in their receiving means no damage or wear will occur to the torque transmitting parts of the clutch if the driving member continues to rotate after the torque limiting clutch has disengaged.

Because of the tapered configuration of the bores 21 and the co-operation of the surfaces 71, 72 of the one clutch member 15 and cage 22, the balls 20 are maintained within their receiving means in the one clutch part 15 and are maintained spaced from the surface of the other clutch part 19 so that there is no tendency for the balls to engage the torque transmitting recesses 24 which they might otherwise do, even though under no load, and thus avoid any clatter which might otherwise arise.

It is noted that in this particular example the clutch happens to be engaged with the parts in such a disposition that the lower parts 65a, 65b of the surface 61 engage the pawls 51,52,54,55 and maintain them within the body 12 and hence out of position for engagement with the abutment surfaces 40a, 40b; 41a, 41b of the cage 22. The raised portions 62a, 62b of the surface 61 engage pawls 50 and 53 so these pawls are disposed outwardly of the body. However, each pair of inclined parts 63a, 64a; 63b, 64b is disposed between the associated abutment surfaces 40a, 40b; 41a, 41b respectively. Hence on disengagement in either direction between the clutch parts 15, 19 each pawl 50, 53 is displaced back into the body 12 as the respective inclined surface part 63a, 64a; 63b, 64b passes each pawl and so the pawls are maintained out of engagement with the abutment surfaces.

Turning now to consider re-setting of the torque limiter. In accordance with the present invention this is achieved automatically merely by reversing the direction of relative rotation between the driving and driven clutch members 10, 11 to that which caused disengagement of the clutch.

In the following description it will be assumed that relative rotation has occurred such that the one clutch part 15 has rotated clockwise, in FIG. 1, relative to the other clutch part 19 and hence that the pegs 36 have engaged the surfaces 35b as shown in FIG. 4.

As the clutch disengages the raised portions 62a, 62b move clockwise to the positions shown in FIGS. 3 and 4. Thus when disengagement is completed the raised portions 62a, 62b; 63a, 63b have moved so that, as shown in FIGS. 3 and 4 the surfaces 40a, 41a are circumferentially aligned with the lower parts 65a, -65b whilst the surfaces 40b, 41b are substantially circumferential aligned with the ends of the raised parts 62a, 62b adjacent to the inclined parts 63a, 63b.

Thus on continued rotation of the clutch after disengagement as the above described raised portion 62a, 62b; pass over each pawl each pawl is caused to move outwardly by its spring and is then forced inwardly by the the inclined surfaces 64a, 64b. It will be noted that the pawls are displaced inwardly by the surfaces 64a,64b before they move in to circumferential alignment with the abutment surfaces 40a, 41a and thus do not engage with these surfaces.

When it is desired to reset the clutch it is merely necessary to arrest the relative rotation and then to reverse it.In the illustrated example it will be assumed that the clutch has chanced to come to rest with the parts in the positions shown in FIGS. 3 and 4. When the direction of relative rotation is reversed the one clutch part 15 and cage 22 are moved together, relative to the other clutch part 19. This rotation of the cage 22 is permitted until the surface part b of the pawl 55 engages the surface 40b. In this case the one clutch part 15 and cage 22 must be rotated through only 15° in an anticlockwise direction to engage the pawl surface 55b and abutment surface 40b.

If the clutch comes to rest up to 15° further clockwise then the one clutch part 15 and cage 22 have to be reversed through up to 30°. If the clutch comes to rest more than 15° further clockwise than shown then another pawl surface will be in position for engagement with a surface 40b, 41b.

A maximum rotation of only 30° is required to cause interengagement of a pawl surface 50b–55b with a surface 40b, 41b since an analogous situation arises wherever the clutch comes to rest throughout the available 360° of relative rotation.

When the relevent pawl, in the present example pawl surface 55b has moved in to engagement with its associated abutment surface,in the present example 40b, rotation of the cage relative to the other clutch part 19 is arrested whilst the one clutch part 15 continues to rotate.

Pawls 50–55 and abutment surfaces 40a,b;41a,b are arranged so that they interengage when the balls 20 and the cage 22 are aligned with the drive recesses 24 in the clutch part 19 so that the balls 20 enter these recesses.

Continued relative rotation between, on the one hand, the one clutch part 15 and, on the other hand, the now secured together cage 22 and other clutch part 19 continues until the receiving means 28 and spacers 27 become aligned therewith which then permits the one clutch part 15 to move axially towards the other clutch part 19 under the bias of spring 18. Again, the angular relationship between the spacer receiving means 28 and the drive recesses 23 is such that the drive recesses 23 engage the balls 20 at the same time that the receiving means 28 engage with the spacers 27 so that the clutch is reset.

The pawls 50–55 are positioned equiangularly around the axis of rotation of the other clutch part 19 and hence there is 60° between each pawl. The re-engagement recesses 42, 43 each extend over an arc of 60° plus an arc equal to that subtended by the diameter of the pawl whilst the centres of the re-engagement recesses are 150° apart. The retaining recesses 34a,b are disposed symmetrically between the re-engagement recesses. The recess 34b centres on the bisector of the 150° angle hereinbefore mentioned and is separated from the recesses 42, 43 by larger diameter parts A of the cage each of which extend over an arc of 21°, whilst the other recesses 34a is separated from the recesses 42, 43 by the larger diameter parts B of the cage each of which extend over an arc of approximately 51°.

The cam surface 61 of the one clutch part 15 has the raised portions 62a, 62b centred on radii having an included angle of 150° therebetween and each extends over an arc of approximately 26°. The cut outs 73 each extend over an arc of approximately 27° and the centre of each cut out is 26.5° from the diameter passing through the centre of the pins 36, this diameter also bisects the angle of 150° mentioned hereinbefore with regard to the position of the raised portions 62a, 62b.

By providing six pawls and two re-engaging recesses 42, 43 the circumferential extent of the large diameter parts A and B of the cage is sufficient for the cage to be retained by the frusto-conical surface 71 of the recess 70 and as explained hereinbefore the angular relationship above described ensures that the clutch requires to be rotated through a maximum of 30° after it has come to rest before the pawls engage the abutment surfaces of the re-engaging recesses. Thus the time available for the drive mechanism to accelerate to a relatively high speed of rotation is small and hence it has been found that the speed of rotation achieved is sufficiently small for the pawls 50–55 not to miss engagement with the surfaces 40a,b; 41a,b.

If the clutch has disengaged as a result of rotation in the opposite direction to that described above then it is reset by likewise performing a reverse rotation in the opposite direction to that described above in which case it will be a surface portion a of a pawl which engages with an abutment surface 41a, 41b.

It will be appreciated that during the re-setting operation, when movement of the cage 22 relative to the other clutch part 19 is prevented, by engagement of the appropriate pawl 50–55, with abutment 40a, b, the rotation between the one clutch part 15 on the one hand and the cage 22 on the other hand is permitted as a result of the bearing 31 provided for the clutch member 30 and rotation of the balls 27 as they orbit along the tracks 29, 33. The one clutch part 15 is maintained out of pressure engagement with the balls 20 during this operation until the spacers 27 are received in the receiving means 28.

Figure 5:
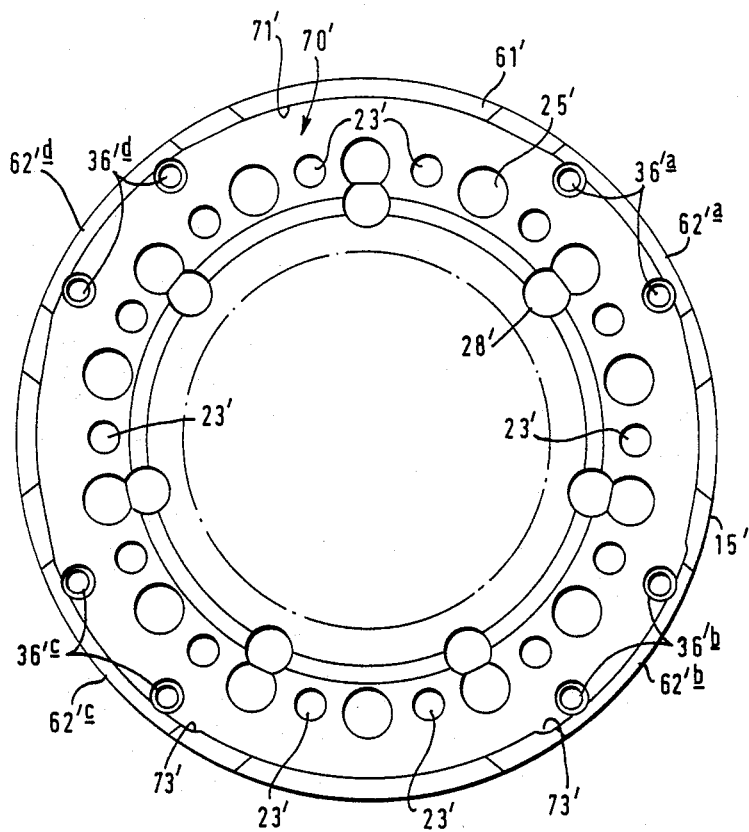
FIG. 5 is a plan view of the one clutch part of a second embodiment of the invention.
Figure 6:
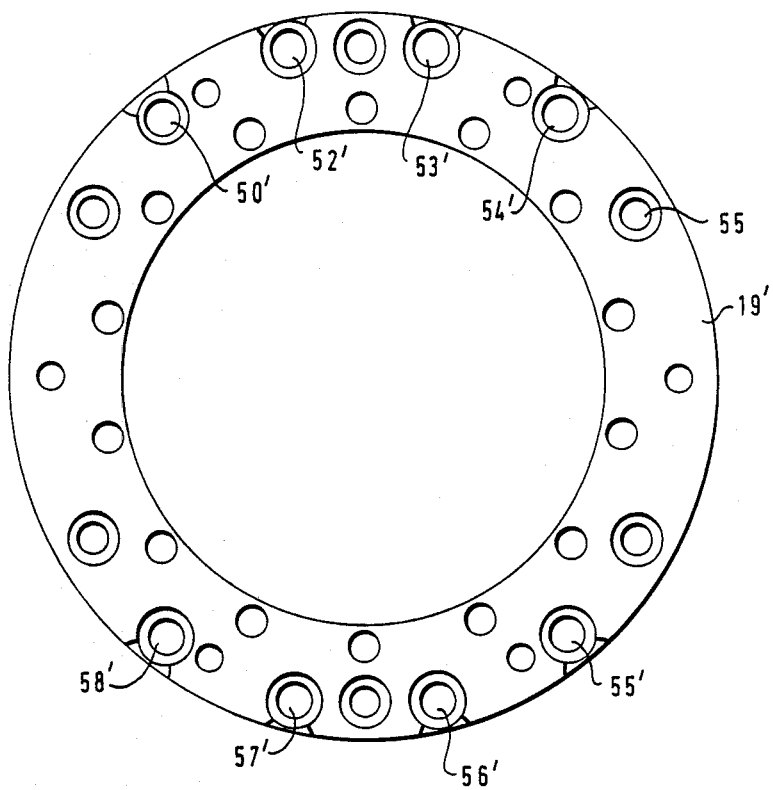
FIG. 6 is a plan view of the other clutch part of a second embodiment of the invention but showing pawls in position.
Figure 7:
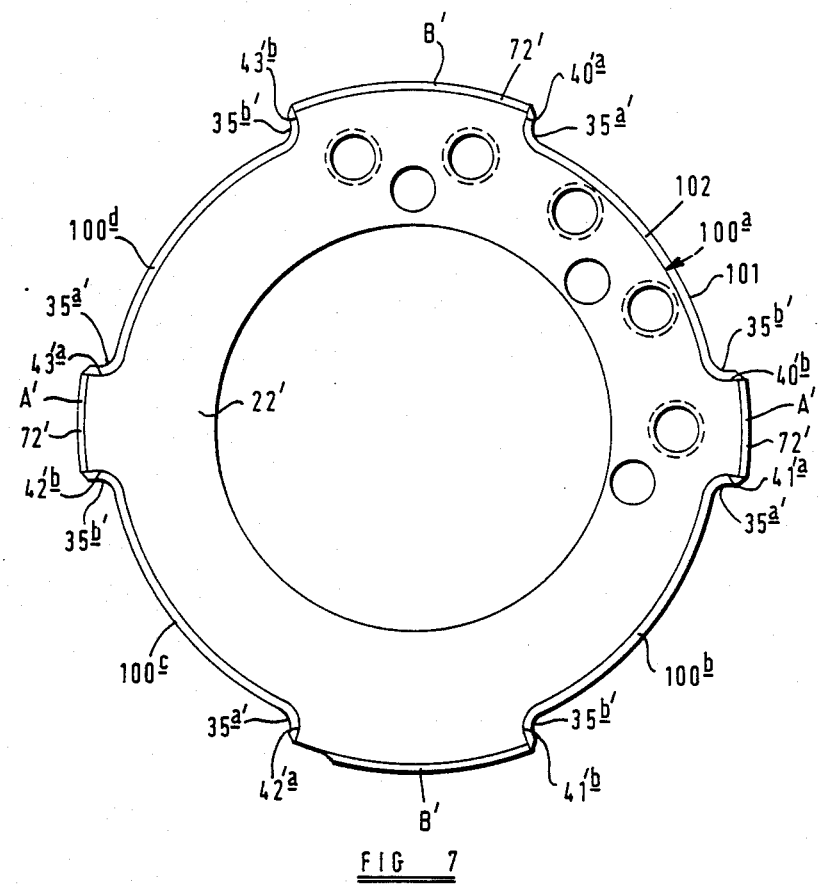
FIG. 7 is a plan view of the cage of the second embodiment of the invention.

If desired, a different number of torque transmitting balls and pawls may be provided with a different configuration of restraining and re-engagement recesses in the cage. For example, as shown in FIGS. 5 to 7 fourteen balls and eight pawls. In FIGS. 5 to 7 the same reference numerals have been used to refer to corresponding parts as were used in FIGS. 1 to 4 but with the addition of a prime sign. Except as hereafter described the embodiment shown in FIGS. 5 to 7 is the same as that described with reference to FIGS. 1 to 4. In this case, the cage 22' is provided with four identical recesses 100a–d, which provide re-engagement recesses as corresponding to the recesses 42, 43 and restraining recesses corresponding to the recesses 34a,b.

Eight pins 36'a–b are provided with the pins being circumferentially aligned with drive recesses and arranged in four pairs. One pair 36'a being angularly related to a second pair 36'b by being separated by a drive recess 23' whilst the pairs 36'a and 36'b are separated from the two further pairs 36'c and 36'd by two intermediate drive transmitting recesses 23' and the pairs 36'c, 36'd are separated by a single drive transmitting recess 23'.

The cam surface 61' is provided with four raised portions 62' which are symmetrically disposed relative to the pairs of pins 36'a–36'd and each extends circumferentially slightly further than the separation of the pins of each pair.

The clutch part 19' is provided with eight pawls 50'–58', arranged in two sets, equi spaced along an arc of 25.714° and each set being centred on a diameter so that the middle two pawls of each set are spaced from the diameter by an arc of 12.857°.

The recesses 100 a–d in the cage 22' are formed to be of stepped configuration therebeing a first part 101 of greater radius from the axis of rotation of the clutch and having abutment portions 35'a, 35'b corresponding to the portions 35'a, 35'b of the first embodiment of a radius corresponding to that of the pins 36'a–36'd and a further portion of a smaller radius relative to the axis of rotation of the clutch but having larger diameter end parts 40'a, b–43'a, b' corresponding to the abutments 40'a–41'b of the first embodiment of a diameter corresponding to the diameter of the pawls.

In this embodiment four cage arresting pins 36'a–b' are provided operable in each direction i.e. a total of eight to ensure that the pins do not fail in service since this embodiment is used for the transmission of relatively high amounts of torque.

The raised surface parts 62' are of such a height as to maintain the pawls out of engagement with the pins 36'a–36'd when the pawls project from their associated clutch part 19' so as not to project above the shoulder between the two parts 101, 102 of the recesses described hereinbefore.

The operation of the clutch is analogous to that described in connection with the first embodiment. In this case the maximum angle through which the clutch must be reversed to engage a pawl with an abutment is 25.7°. Thus again the time available for acceleration is relatively small so that the pawls do not miss the abutments.

The disposition of the larger diameter parts A' B' of the cage is such that they can be introduced into the recess 70' through cut outs 73' provided in the frusto-conical wall 71' and then retained therein after rotation through 90° to position the raised parts 62'a–d' circumferentially adjacent to recesses 100a–d respectively. The pins 36'a–36'd are then inserted into the clutch part 15'.

I claim:

1. A torque limiting clutch comprising a driving part, a driven part, a cage, means mounting said parts and cage for relative rotation and each of said parts having at least one torque transmitting abutment, a rolling torque transmitting element disposed between said parts and guided by said cage, biasing means to bias axially said element into torque transmitting engagement with said torque transmitting abutments of said parts when said clutch is engaged, said rolling element being movable out of engagement with said torque transmitting abutments to disengage the clutch on application of a torque exceeding a predetermined torque to one of said parts, a torque transmitting element receiving means in one of said parts to accommodate said element when the clutch is disengaged, a spacer, movable by said cage into spacing relationship with said parts on disengagement of the clutch wherein said clutch can be disengaged by relative rotation between said parts in either direction and said clutch can be re-engaged by relative rotation between said parts in the opposite direction to that which caused disengagement, said clutch including two sets of inter-engageable abutments, the inter-engageable abutments of a first of said sets being provided on the cage and the inter-engageable abutments of the second of said sets being provided on the other of said parts and being operable to cause inter-engageable abutments of the first and second sets to inter-engage to cause said cage and said other of said parts to rotate together, each of said sets including a plurality of inter-engageable abutments, a first plurality of inter-engageable abutments of each set being operable on relative rotation between the clutch parts in the opposite direction to that in which a second plurality of inter-engageable abutments of each set is operable, biasing means normally to bias the inter-engageable abutments in a direction towards said inter-engagement, first control means being provided on said one clutch part (a) to prevent inter-engagement of said inter-engageable abutments of the first plurality when said clutch is disengaged as a result of relative rotation in one direction whilst permitting inter-engagement of a pair of said inter-engageable abutments of the second plurality on resetting by relative rotation in the reverse direction to said one direction; and (b) to prevent inter-engagement of said inter-engageable abutments of the second plurality when said clutch is disengaged as a result of relative rotation in the opposite direction to said one direction whilst permitting inter-engagement of a pair of said inter-engageable abutments of the first plurality on resetting by relative rotation in the reverse direction to said other direction and second control means to maintain said inter-engageable abutments of both pluralities out of inter-engagement during the initial stages of disengagement of said clutch.

2. A clutch according to claim 1 wherein retaining means are provided between the one part and the cage to limit movement of the cage away from the one part and the cage having openings to receive said torque transmitting element and being shaped to restrain movement of the torque transmitting element away from said one part.

3. A clutch according to claim 2 wherein the retaining means comprise male and female interengaging portions provided around the periphery of the cage and an adjacent part of the one clutch part.

4. A clutch according to claim 3 wherein the female part comprises a rebate having a frusto-conical surface and the male part a frusto-conical surface of co-operating configuration with the female frusto-conical surface.

5. A clutch according to claim 1 wherein there are more abutments in the second set than in the first set.

6. A clutch according to claim 5 wherein there are twelve torque transmitting elements and six abutments in each of the first and second pluralities of the second set and two abutments in each of the first and second pluralities of the first set.

7. A clutch according to claim 6 wherein there are fourteen torque transmitting elements and eight abutments in each of the first and second pluralities of the second set and four abutments in each of the first and second pluralities of the first set.

8. A clutch according to claim 1 wherein the abutments of the second set comprise spring biased pawls and the abutments of the first set being adapted to be engaged by the pawls.

9. A clutch according to claim 8 wherein a separate pawl provides one abutment of the first plurality and one abutment of the second plurality of abutments of the second set and each pawl is mounted on said other clutch part for movement generally parallel to the axis of rotation of the clutch and have an end part, substantially diametrically opposite surface parts of which provide said abutments which are adapted to engage an abutment surface of the first set provided on the cage.

10. A clutch according to claim 8 wherein the first and second control means comprise a cam surface provided on the one clutch part and facing said other clutch part and having a first surface part adjacent the other part which engages said pawls so that said pawls are maintained out of engagement with the abutments of the cage during said initial stages of disengagement, and having a second surface part spaced further away from the other part to permit the pawls to move into position for engagement with the abutment surfaces of the cage and third, inclined, surface parts between the first and second parts wherein on continued relative rotation between the one and other clutch parts after disengagement, said third surface parts displace the pawls out of position for engagement with the abutment surfaces of the cage whilst the pawls are permitted to move into engagement with an abutment surface of the cage on reverse rotation.

* * * * *